(12) United States Patent
Olberg et al.

(10) Patent No.: US 9,855,702 B1
(45) Date of Patent: Jan. 2, 2018

(54) METHOD AND APPARATUS FOR MAKING COMPOSITE FILLERS

(71) Applicant: The Boeing Company, Chicago, IL (US)

(72) Inventors: Jeffrey H. Olberg, Federal Way, WA (US); Ryan C. Lucas, Puyallup, WA (US)

(73) Assignee: THE BOEING COMPANY, Chicago, IL (US)

( * ) Notice: Subject to any disclaimer, the term of this patent is extended or adjusted under 35 U.S.C. 154(b) by 1093 days.

(21) Appl. No.: 14/045,195

(22) Filed: Oct. 3, 2013

(51) Int. Cl.
| | |
|---|---|
| B29C 70/52 | (2006.01) |
| B29C 43/46 | (2006.01) |
| B29C 43/24 | (2006.01) |
| B29C 59/04 | (2006.01) |
| B29C 47/32 | (2006.01) |
| B29C 70/50 | (2006.01) |

(52) U.S. Cl.
CPC .............. B29C 59/04 (2013.01); B29C 70/52 (2013.01); *B29C 43/24* (2013.01); *B29C 43/46* (2013.01); *B29C 47/32* (2013.01); *B29C 70/504* (2013.01)

(58) Field of Classification Search
CPC ....... B29C 43/24; B29C 43/245; B29C 47/32; B29C 43/46; B29C 70/504; B29C 70/506; B29C 70/508
USPC .......................... 100/227, 168, 169, 172, 176
See application file for complete search history.

(56) References Cited

U.S. PATENT DOCUMENTS

| | | | | |
|---|---|---|---|---|
| 4,117,054 A | * | 9/1978 | Salo | B21B 13/14 |
| | | | | 100/168 |
| 4,269,140 A | * | 5/1981 | Burns | D06B 15/02 |
| | | | | 100/47 |
| 4,559,005 A | * | 12/1985 | Gants | B29C 70/504 |
| | | | | 425/363 |
| 4,789,594 A | | 12/1988 | Stawski | |
| 4,988,278 A | | 1/1991 | Mills | |
| 5,211,965 A | | 5/1993 | Kitagawa | |
| 5,311,814 A | * | 5/1994 | Kierson | B29C 43/222 |
| | | | | 101/22 |
| 5,501,145 A | * | 3/1996 | Fromm | B29C 43/28 |
| | | | | 100/158 R |
| 6,562,436 B2 | | 5/2003 | George et al. | |
| 6,709,538 B2 | | 3/2004 | George et al. | |
| 2010/0024966 A1 | | 2/2010 | Felip | |
| 2011/0049750 A1 | | 3/2011 | Bechtold | |

(Continued)

FOREIGN PATENT DOCUMENTS

| | | |
|---|---|---|
| EP | 0356449 B1 | 6/1992 |
| WO | WO8808367 A1 | 4/1988 |
| WO | WO2005011961 A1 | 7/2004 |

OTHER PUBLICATIONS

Notice of Allowance, dated Apr. 12, 2016, regarding U.S. Appl. No. 14/045,270, 7 pages.

(Continued)

*Primary Examiner* — Jeffrey Wollschlager
*Assistant Examiner* — Armand Melendez
(74) *Attorney, Agent, or Firm* — Yee & Associates, P.C.

(57) ABSTRACT

A composite filler noodle is pulled through upper and lower roller dies respectively rotatable about first and second axes. The first and second axes are aligned to extend substantially parallel to each other within a plane that is substantially orthogonal to an axis of movement of the noodle.

22 Claims, 13 Drawing Sheets

(56) References Cited

U.S. PATENT DOCUMENTS

2013/0105072 A1    5/2013   Anderson et al.
2013/0134621 A1*   5/2013   Tsotsis .................. B29B 11/16
                                                    264/177.2

OTHER PUBLICATIONS

Office Action, dated Jun. 23, 2015, regarding U.S. Appl. No. 14/045,270, 11 pages.
Sutkus et al., "Automated Fabrication of Composite Fillers," U.S. Appl. No. 14/045,270, filed Oct. 3, 2013, 47 pages.
Final Office Action, dated Jan. 29, 2016, regarding U.S. Appl. No. 14/045,270, 9 pages.

* cited by examiner

METHOD AND APPARATUS FOR MAKING COMPOSITE FILLERS

CROSS REFERENCE TO RELATED APPLICATIONS

This application is related to co-pending U.S. patent application Ser. No. 14/045,270, filed concurrently herewith on Oct. 3, 2013, which is incorporated by reference herein in its entirety.

BACKGROUND INFORMATION

1. Field

The present disclosure generally relates to the fabrication of composites, and deals more particularly with a method and apparatus for making composite filler noodles used to fill voids and strengthen joints in composite assemblies.

2. Background

Composite assemblies sometimes contain voids or recesses that must be filled in order to maximize the strength and/or rigidity of the assembly. For example, two or more composite stiffener members may be bonded together along radiused edges that form a joint having a radiused V-shaped groove. In order to strengthen the joint, a pre-formed radius filler, sometimes referred to as a "noodle", is placed in the groove and bonded.

Filler noodles may be employed in high-performance primary structures such as beams, spars and other stiffeners used in the aircraft industry. Noodles used in these high-performance applications may have tight dimensional specifications and require a relatively high degree of compaction. Higher levels of compaction may be necessary in order to minimize undesired voids and porosities in the filler. The reduction of voids and porosities may contribute to an increase in joint strength. The production of such noodles can be challenging, particularly in high rate production environments. In high rate production environments, it may be difficult to consistently control features and dimensions of the noodle over the long noodle lengths that are sometimes required for aircraft applications.

Automated pultrusion machines have been proposed for producing filler noodles used in high-performance applications. In these machines, pre-preg tape is continuously pulled through one or more static dies which fold and form the tape to the desired cross-sectional noodle shape. Each of the static dies comprises an upper and lower die section, which form a nip through which the pre-preg tape is pulled or "pultruded". These static dies suffer from several deficiencies that may result in noodles that do not meet required specifications. For example, it is sometimes difficult to achieve precise angular co-alignment of the upper and lower die sections. Misalignment of the die sections may distort the shape of the die opening, and thus may cause the profile and/or shape of the noodle to be out of tolerance.

Other problems with existing static dies stem from the friction between the pre-preg tape and the die as the tape passes across the edges of the die. This friction may result in a force being applied to one or both of the die sections that is sufficient to deform the profile of the die opening, and in turn change the cross-sectional profile of the noodle. In some cases, the friction between edges of the die and the pre-preg tape may be severe enough to cause the tape to tear, or cause fibers in the tape to the fray. Tears in the tape or fraying of the fibers may affect the surface finish and/or performance of the noodle.

Accordingly, there is a need for a method and apparatus for producing composite filler noodles for high-performance applications that reduce friction between pre-preg tape and a forming die as the tape is being pulled through the die. There is also a need for a pultrusion die having die sections that can be angularly co-aligned and which remain aligned as tape is being pulled through the die.

SUMMARY

The disclosed embodiments provide a method and apparatus for producing composite filler noodles suitable for use in high-performance primary composite structures. Noodles can be produced having consistent cross-sectional profiles with high dimensional control, high levels of compaction, and desired surface finishes. The forming dies remain properly aligned during the noodle forming process, and friction between the dies and the pre-preg tape being pulled through the dies is substantially reduced. Reduced friction and improved die alignment result in higher quality filler noodles, while reducing machine downtime and material scrap.

According to one disclosed embodiment, apparatus is provided for producing a composite filler noodle. The apparatus comprises upper and lower roller die assemblies through which composite material is pulled. The upper and lower roller dies have a nip therebetween through which composite material may be drawn along an axis of movement. The upper roller die assembly including an upper roller die rotatable about a first axis of rotation, and the lower roller die assembly including a lower roller die rotatable about a second axis of rotation. The first axis of rotation and the second axis of rotation extend substantially parallel to each other within a plane substantially orthogonal to the axis of movement, resulting in a precisely controlled die profile opening through which composite material may be pulled. The apparatus further comprises an upper mount having the upper roller die assembly mounted thereon, and a lower mount having a lower roller die assembly thereon. The upper and lower mounts are arranged in a predetermined spatial orientation relative to each which results in a nip having a desired die opening profile with tightly controlled dimensions. The upper mount and the upper roller die assembly include a first set of indexing points, and the lower mount and the lower roller die assembly include a second set of indexing points. The first and second sets of indexing points align the upper and lower roller die assemblies relative to each other to form the desired die opening profile. The first set of indexing points includes at least two index points spaced apart along a first axis, and the second set of indexing points includes at least two indexing points spaced apart along a second axis generally orthogonal to the first axis. The first set of indexing points includes at least one projection on the upper roller die assembly, and at least one recess in the upper mount for receiving the projection therein. The apparatus further comprises a guide rail on which the upper roller die assembly is mounted for sliding movement toward and away from the second roller die assembly. The apparatus may also include an actuator for sliding the upper roller die assembly along the guide rail. The upper roller die includes a recess therein, and the lower roller die extends into the recess and brings the upper roller die into alignment with the upper roller die. The upper and lower roller dies respectively include first and second dies faces forming a nip through which the noodle may be pulled.

According to anther disclosed embodiment, a pultrusion die apparatus is provided for forming a composite noodle. The pultrusion apparatus comprises a first roller die, and a second roller die. The first and second roller dies form a nip through which composite material may be pulled to form a desired noodle profile. The first roller die is shiftable relative to the second roller die, between an open, standby position, and a closed, forming position, while the second roller die is fixed. The pultrusion die apparatus may further comprise a guide rail, a mount slidable on the guide rail and having the first roller die mounted thereon, and indexing points for aligning the first and second roller dies relative to each other. The pultrusion die apparatus may also include a first mount upon which the first roller die is mounted for rotation about a first axis, a second mount upon which the second roller die is mounted for rotation about a second axis, and an indexing arrangement including index points on the first mount and the second mount, the indexing arrangement aligning the first axis of rotation with the second axis of rotation. The first roller die includes a grooved die face, and the second roller die includes a substantially flat die face. The first roller die includes a recess therein adjacent the grooved die face, and the substantially flat die face is received within the recess to align the first roller die with the second roller die. The first roller die includes a beveled surface adjacent the recess for guiding the flat die face into the recess.

According to still another disclosed embodiment, a method is provided of pultrusion forming an elongate composite noodle. The method comprises drawing composite material through a nip between first and second roller dies, and using frictional engagement between the composite material and the first and second roller dies to rotate the first and second roller dies respectively about first and second axes of rotation as the composite material is being drawn through the nip. The method also includes aligning the first and second axes of rotation substantially parallel to each other in a plane extending substantially orthogonal to the axis of movement. The method may further comprise mounting the first and second roller dies respectively on first and second mounts. The first and second roller dies are aligned by using first and second sets of index points to index the first and second roller dies respectively on the first and second mounts. The method may also include slidably moving the first roller die toward and away from the second roller die while the first and second axes of rotation remains substantially parallel to each other.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

DETAILED DESCRIPTION

The disclosed embodiments relate to a method and apparatus for producing high-performance composite fillers, sometimes referred to hereinafter as "noodles". The noodles may be used to strengthen primary composite structures and assemblies, such as the composite laminate I-beam 30 shown in FIGS. 1 and 2. The I-beam 30 comprises an upper cap 34 and a lower cap 36 joined by a web 32. The I-beam 30 may be produced by joining a pair of C-shaped members 38 having outwardly turned flanges 40 that each transition to the web 32 through a radius 48. The area between the two radii 48 and the caps 34, 36 forms a void 53 that is filled by a composite filler noodle 46 produced in accordance with the disclosed embodiments described below. The noodle 46 may comprise, without limitation, pre-preg tape that is folded and formed into the desired cross-sectional profile, continuously along the length of the noodle 46.

Figures 1, 2, 3:
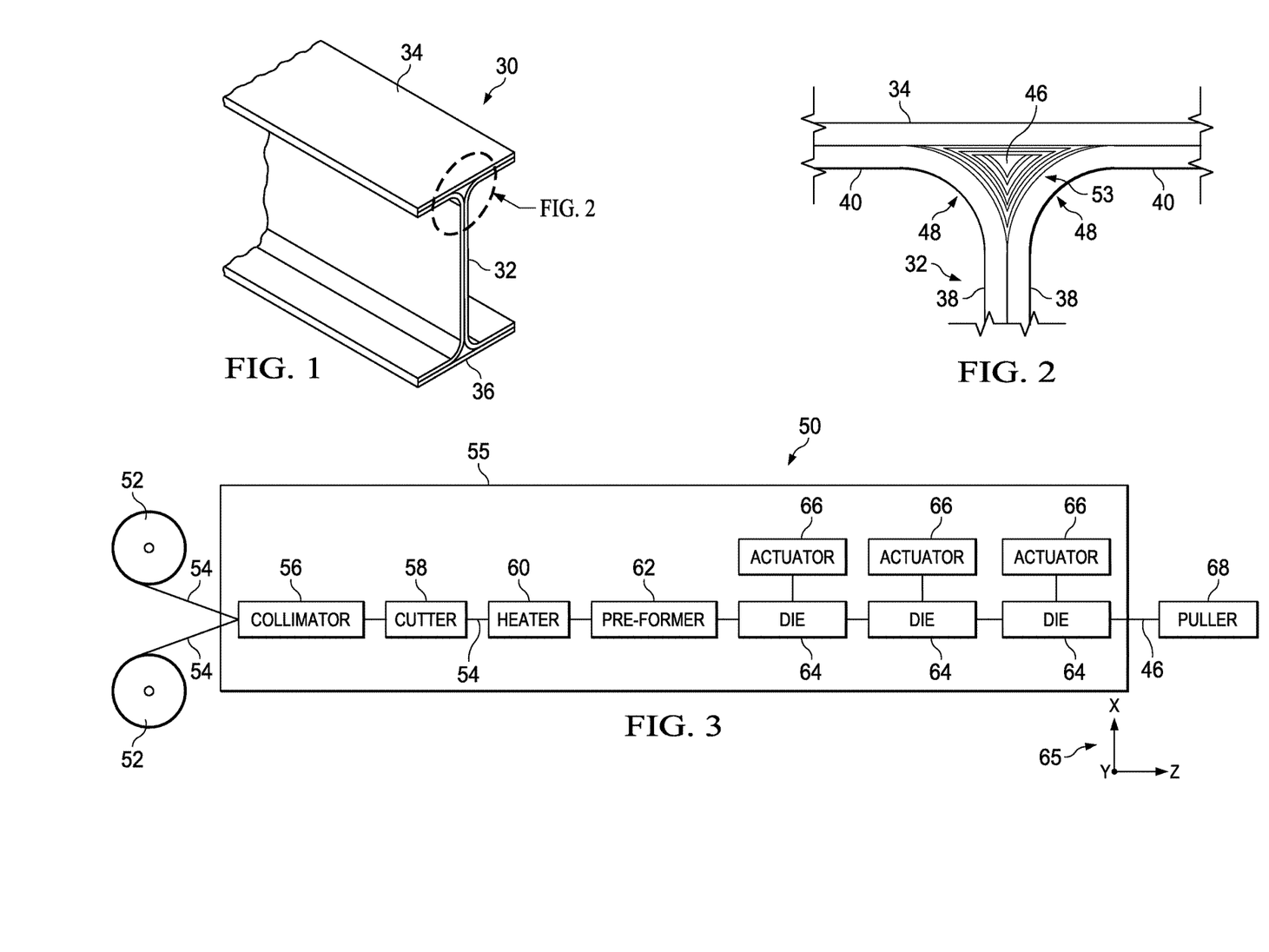
FIG. 1 is an illustration of a portion of a composite I-beam employing a filler noodle according to the disclosed embodiments.
FIG. 2 is an illustration of the area designated as FIG. 2 in FIG. 1.
FIG. 3 is an illustration of a diagrammatic view of apparatus for forming the filler noodle shown in FIG. 2.

The noodle 46 may be fabricated using a pultrusion apparatus broadly illustrated by the numeral 50 in FIG. 3. Composite material 54, such as, without limitation, pre-preg tape may be drawn from one or more material supply spools 52 and fed to a collimator 56 where the material 54 is prearranged, such as by placing and stacking the pre-preg tape. An optional cutter 58 may cut the material 54 to a desired width before the material 54 is warmed to a suitable forming temperature by a heater 60. Depending upon the size and shape of the noodle 46 being formed, the composite material 54 may be roughly shaped and performed into a generalized profile shape by a preformer 62. Following preforming, the preformed composite material 54 is passed through one or more dies 64. In the illustrated example, three dies 64 are employed, however more than three dies 64 or as few as a single die 64 may be employed, depending upon the particular noodle 46 being formed.

Each of the dies 64 is controlled by a corresponding actuator 66. Each of the dies 64 may be used to form a different section of the length of the noodle 46 in those applications where the cross-sectional profile of the noodle 46 varies along its length. The composite material 54 is pulled continuously through the dies 64 by a puller 68. Although not shown in FIG. 3, a cutter may cut the noodle 46 to the desired length. Collimator 56, cutter 58, heater 60, preformer 62 and the dies 64 may be mounted on a common machine frame 55, and aligned with each other in a common XYZ machine coordinate system 65.

Figure 4:
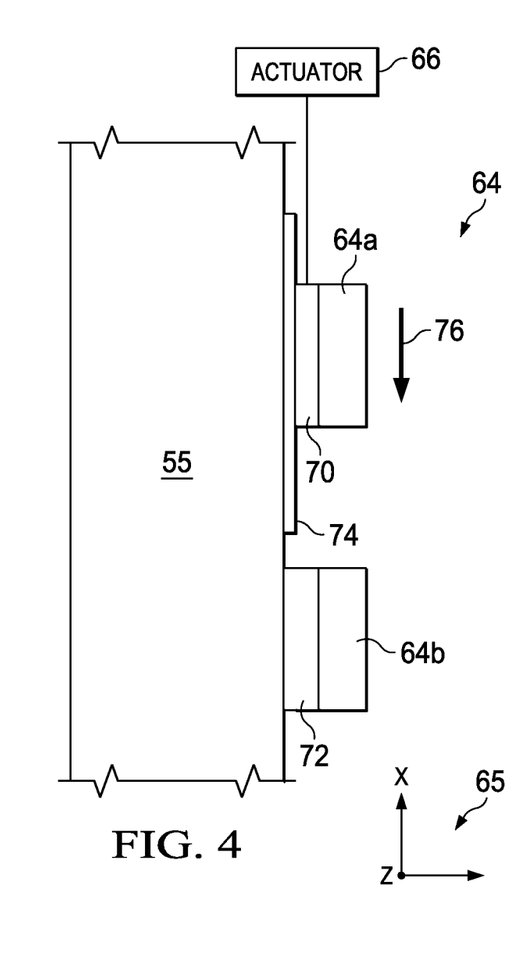
FIG. 4 is an illustration of a diagrammatic side view of a portion of the apparatus shown in FIG. 3, showing the die assembly in an open, standby position.
Figure 5:
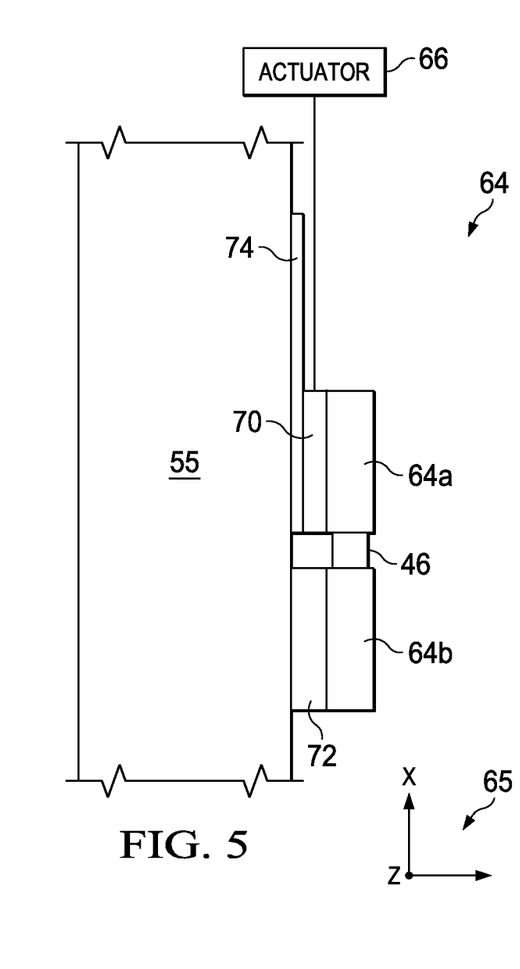
FIG. 5 is an illustration similar to FIG. 4 but showing the die assembly in a closed, noodle forming position.

Attention is now directed to FIGS. 4 and 5 which illustrate one of the dies 64 mounted on the machine frame 55. The die 64 broadly comprises an upper roller die assembly 64a and a lower roller die assembly 64b between which the composite material 54 is formed into the desired noodle 46. The upper roller die assembly 64a is attached to an upper mount 70 which is slidably mounted on a guide rail 74 for movement toward and away the lower roller die assembly 64b, between a standby position (shown in FIG. 4) and an operative forming position (shown in FIG. 5). The guide rail 74 is secured to the machine frame 55 by any suitable means. The lower roller die assembly 64 is stationarily fixed to a lower mount 72 attached to the machine frame 55. An actuator 66, which may comprise a pneumatic or electric actuator, is coupled with the upper mount 70 and controls the movement of the upper die assembly 64a along the guide rail 74. FIG. 4 shows the upper roller die assembly 64a in an elevated, standby position, while FIG. 5 shows upper roller die assembly 64a having been displaced by the actuator 66 downwardly into its operative, noodle forming position.

Figure 6:
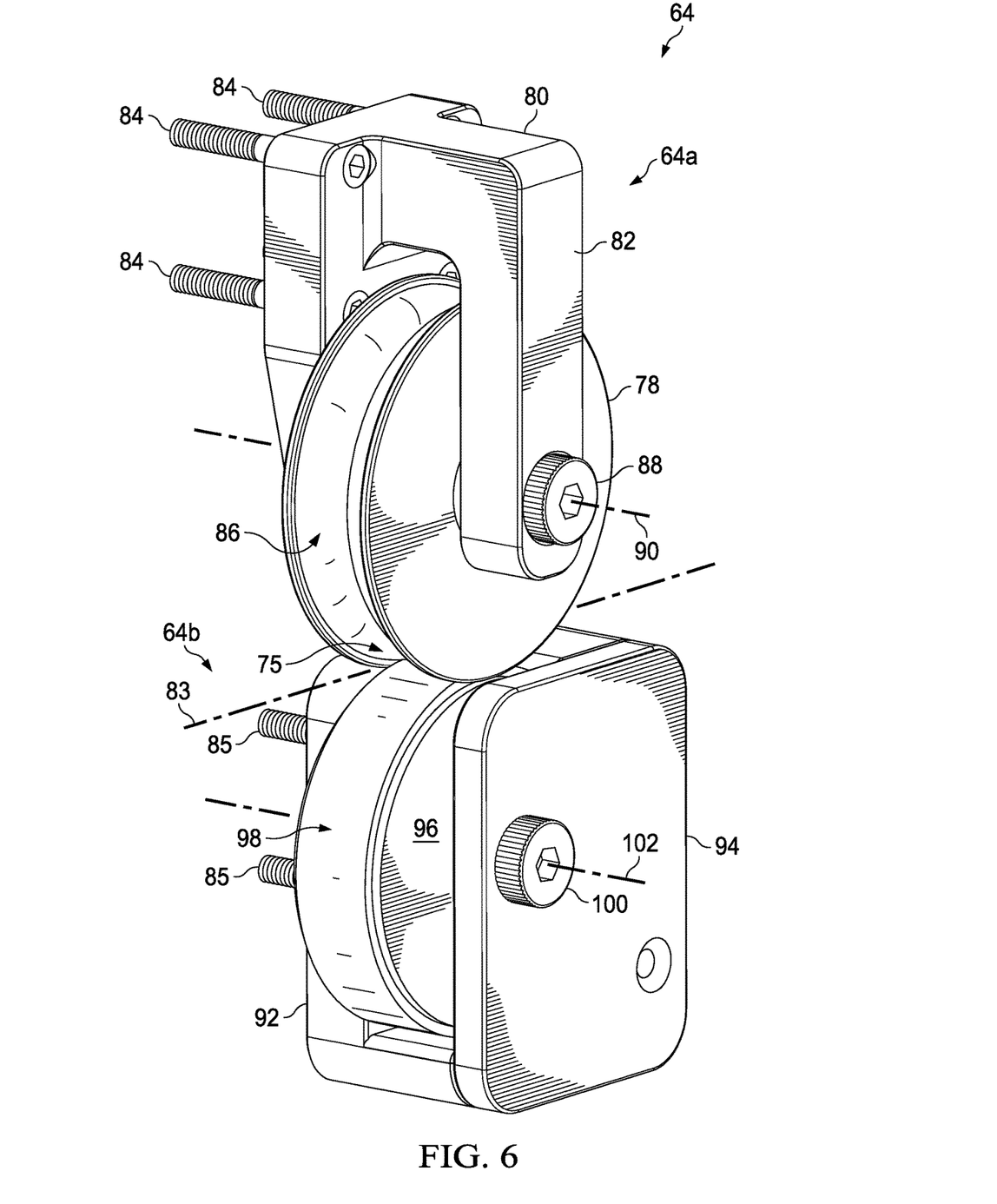
FIG. 6 is an illustration of an isometric view of the die assembly shown in FIGS. 4 and 5.
Figure 7:
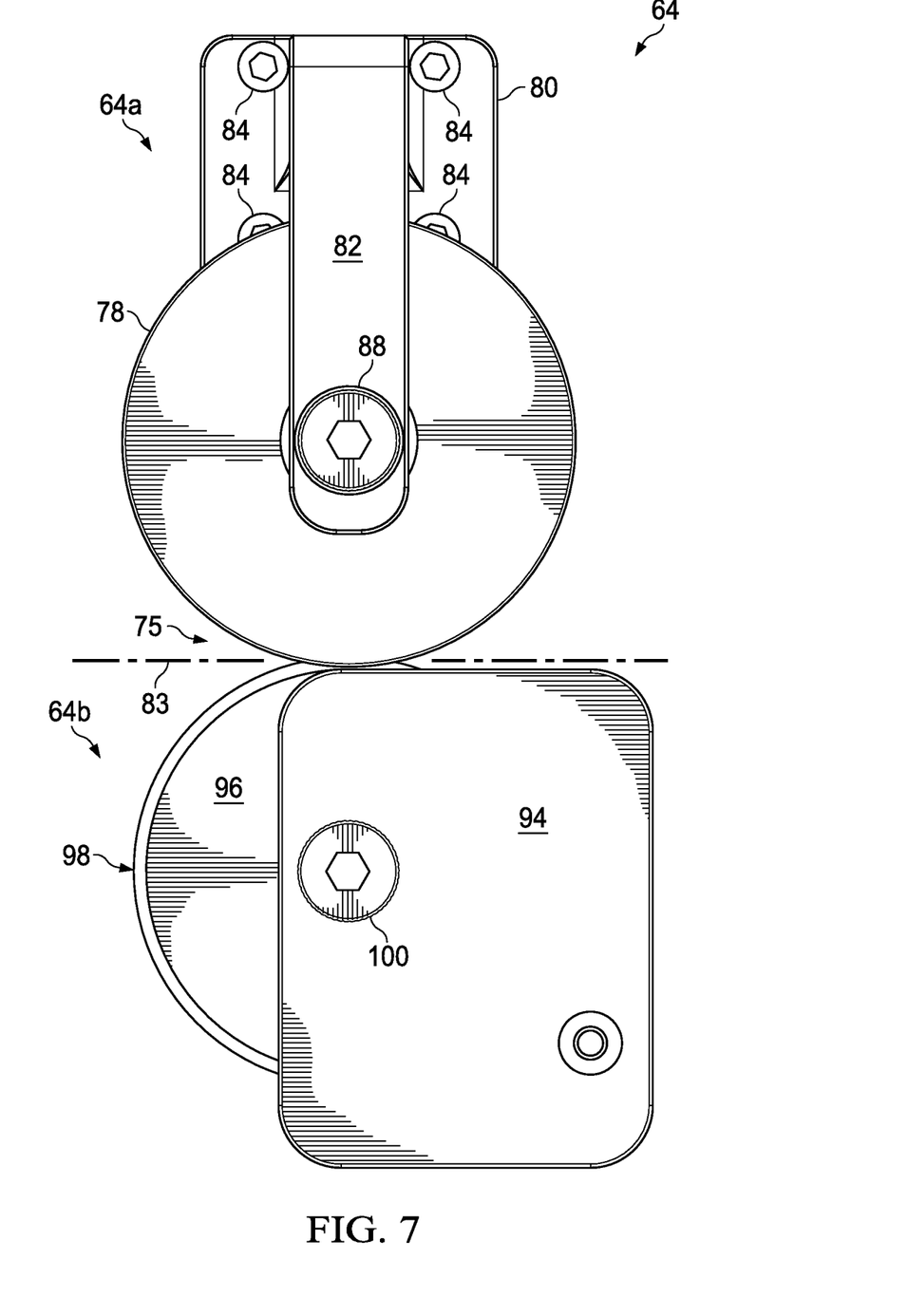
FIG. 7 is an illustration of a front view of the die assembly shown in FIG. 6.
Figure 8:
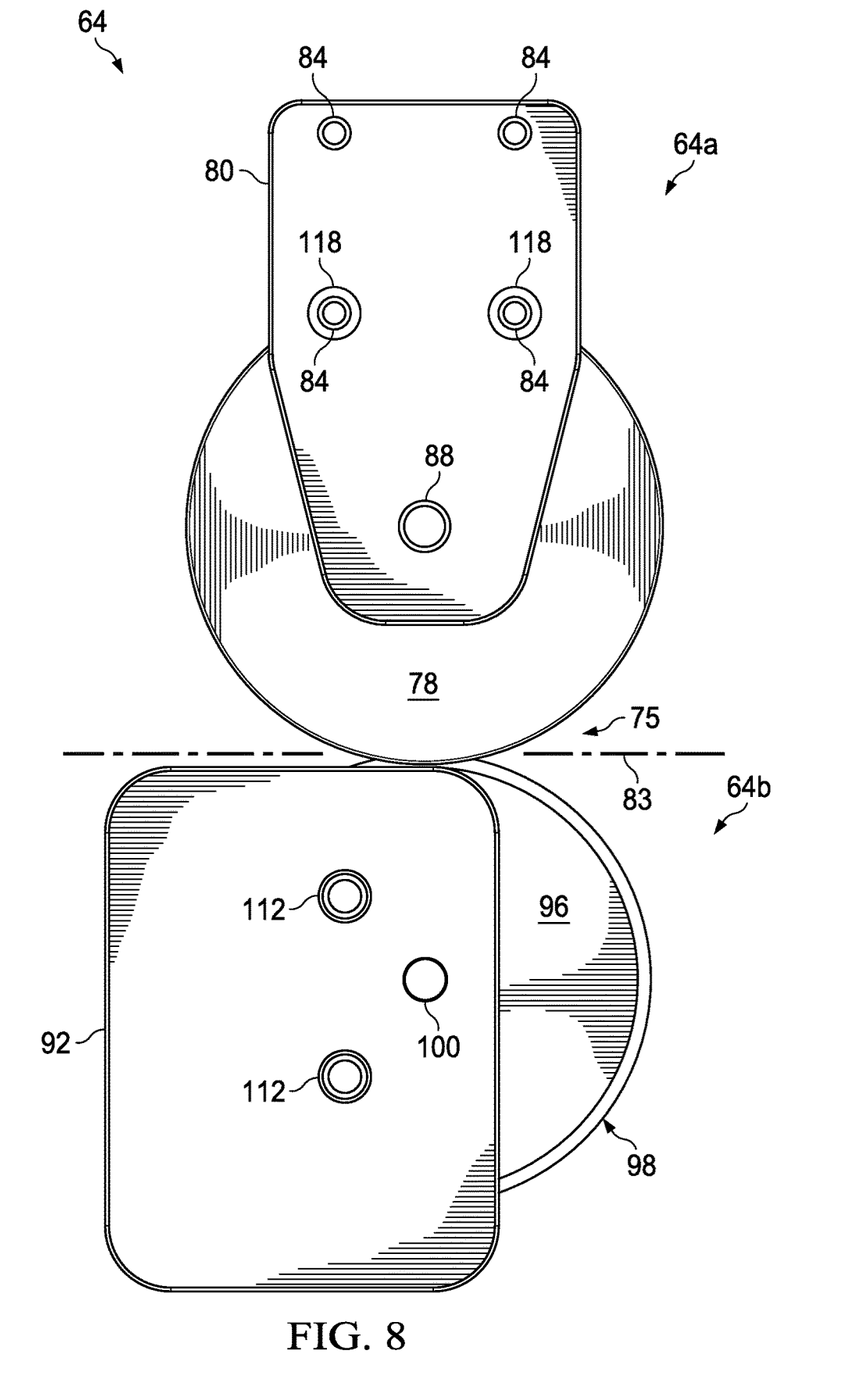
FIG. 8 is an illustration of a rear view of the die assembly.
Figure 9:
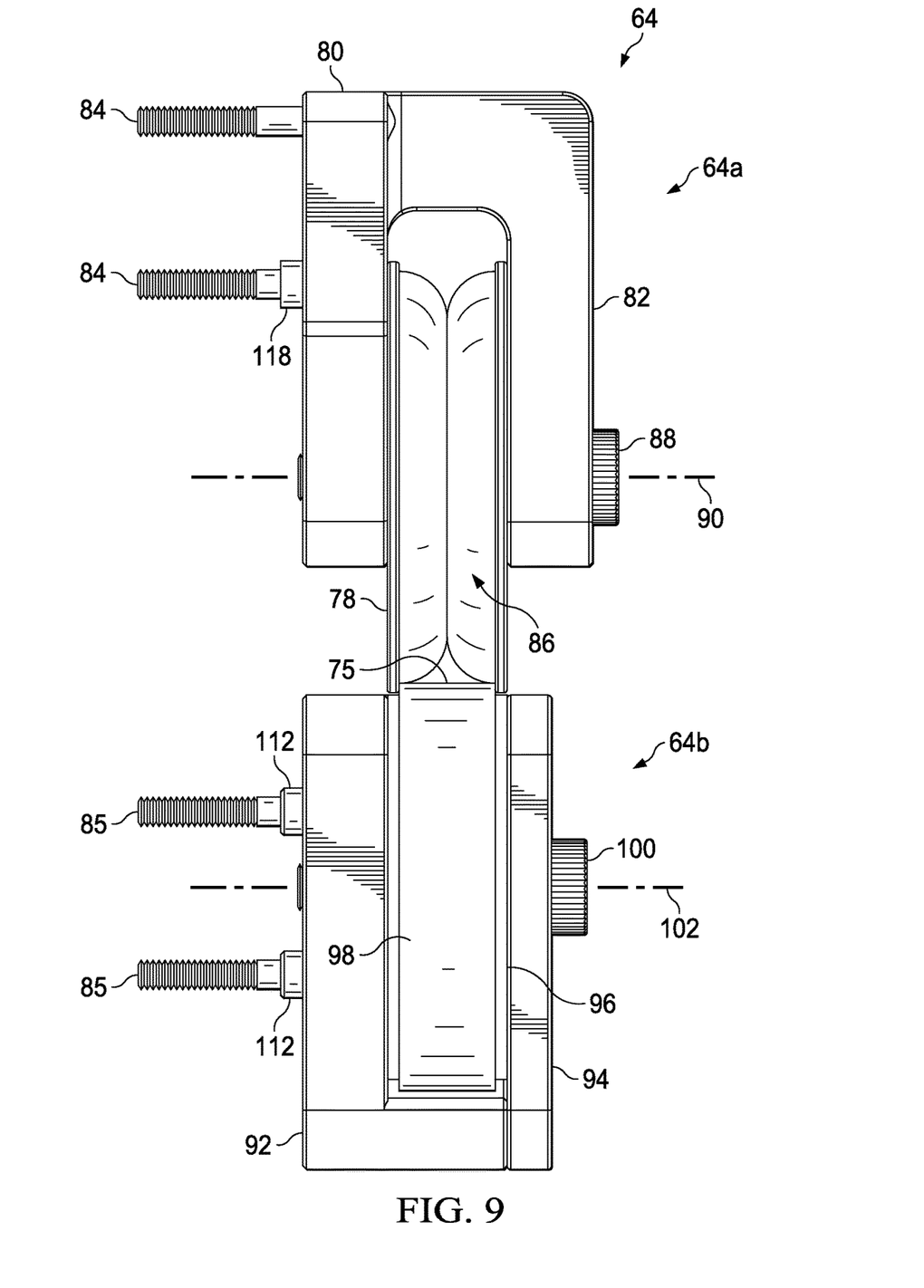
FIG. 9 is illustration of a left side view of the die assembly.
Figure 10:
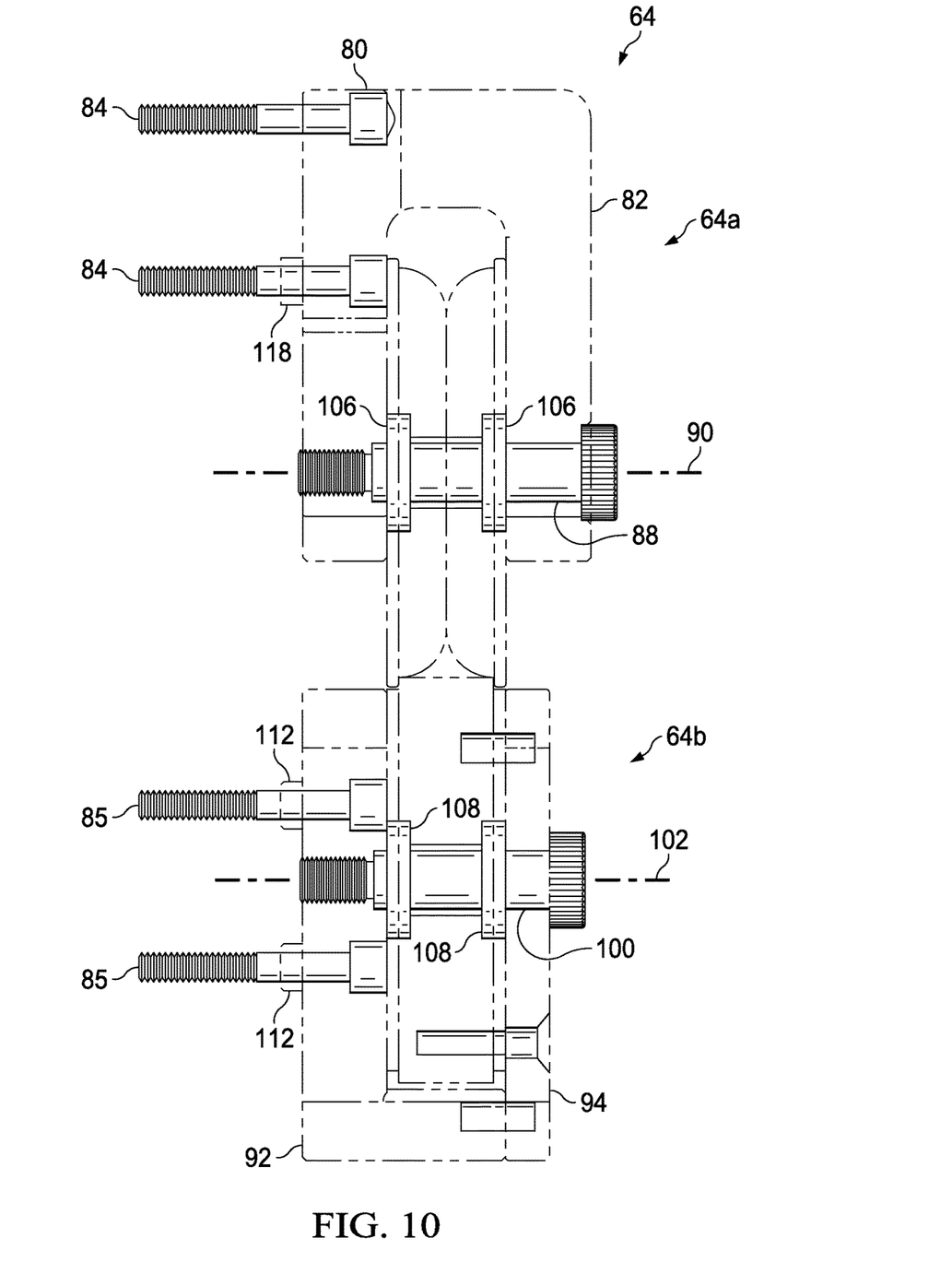
FIG. 10 is an illustration similar to FIG. 9, certain of the components being shown partially transparent to better reveal the location of roller die axles and bearings.

Attention is now directed to FIGS. 6-10 which illustrate additional details of one of the dies 64. The die 64 broadly comprises an upper roller die assembly 64a, and a lower roller die assembly 64b which, as previously discussed in connection with FIGS. 5 and 6, are respectively mounted in indexed relationship to each other on upper and lower mounts 70, 72, discussed below in more detail. The upper roller die assembly 64a includes an upper roller mount 80 provided with a roller mount arm 82 and an axle 88. The upper roller mount 80 is attached to the upper mount 70 (FIGS. 4 and 5) by four fasteners 84. An upper roller die 78 is journaled for rotation on the upper axle 88 by a pair of spaced apart ball bearings 106 (see FIGS. 10 and 15) that are fixed on the upper axle 88. The upper roller die 78 rotates about the longitudinal axis 90 of the upper axle 88. The upper roller die 78 includes a grooved die face 86 adapted to engage and form a first portion of the profile of the noodle 46.

The lower roller die assembly 64b includes a lower mount back 92 secured by two fasteners 85 to the lower mount 72, and a cap 94 secured to the mount back 92. A lower axle 100 is secured to and passes through the mount back 92 and the cap 94. A lower roller die 96 is journaled for rotation on the lower axle 100 by a pair of spaced apart roller bearings 108 (FIGS. 10 and 15) mounted on the lower axle 100. The lower roller die 96 rotates about the longitudinal axis 102 of the lower axle 100. The lower roller die 96 includes a substantially flat die face 98 for forming a second, remaining portion of the profile of the noodle 46.

Composite material 54 (FIG. 3) is drawn by the puller 68 along an axis 83 of movement into a nip 75 between the upper and lower roller dies 78, 96. The frictional engagement between the composite material 54 and the upper and lower roller dies 78, 96 causes the latter to rotate about their respective axes of rotation 90, 102. The cross-sectional shape of the preformed composite material 54 drawn into the nip 75 is greater than the cross-sectional profile of the nip 75. Consequently, forces are exerted by the roller dies 78, 96 on the preformed composite material 54 which cause the composite material 54 to be compressed and substantially formed into the shape of the cross-sectional profile of the nip 75. As will be discussed below in more detail, an indexing arrangement is used to mount the upper and lower roller die assemblies 64a, 64b such that the axes of rotation 90, 102 are substantially parallel to each other within a plane that has a desired orientation relative to the axis 83 of movement of the composite material 54.

Figure 11:
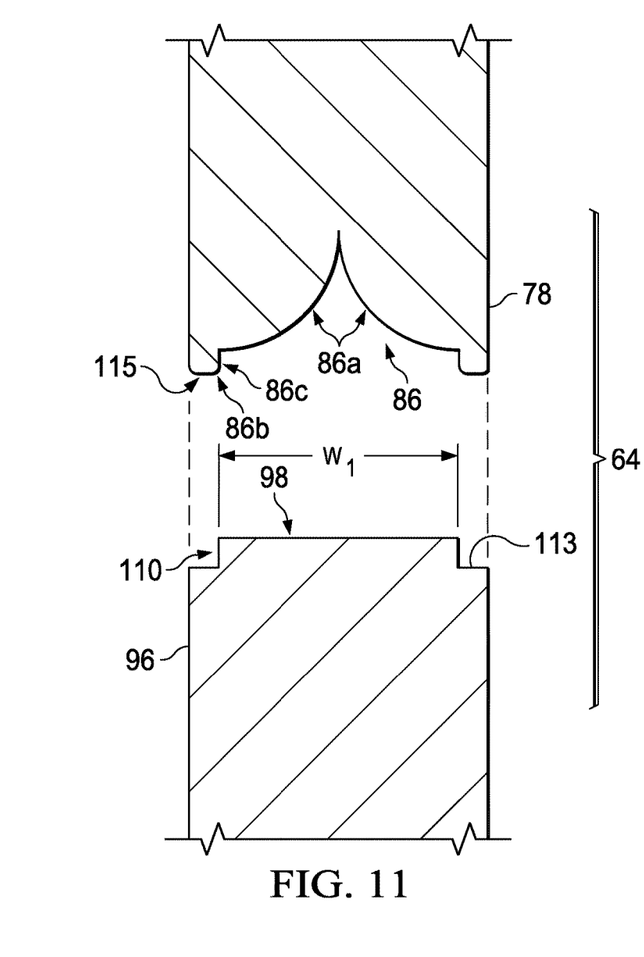
FIG. 11 is an illustration showing cross sectional profiles of the forming surfaces of the upper and lower roller dies in an open position.
Figure 12:
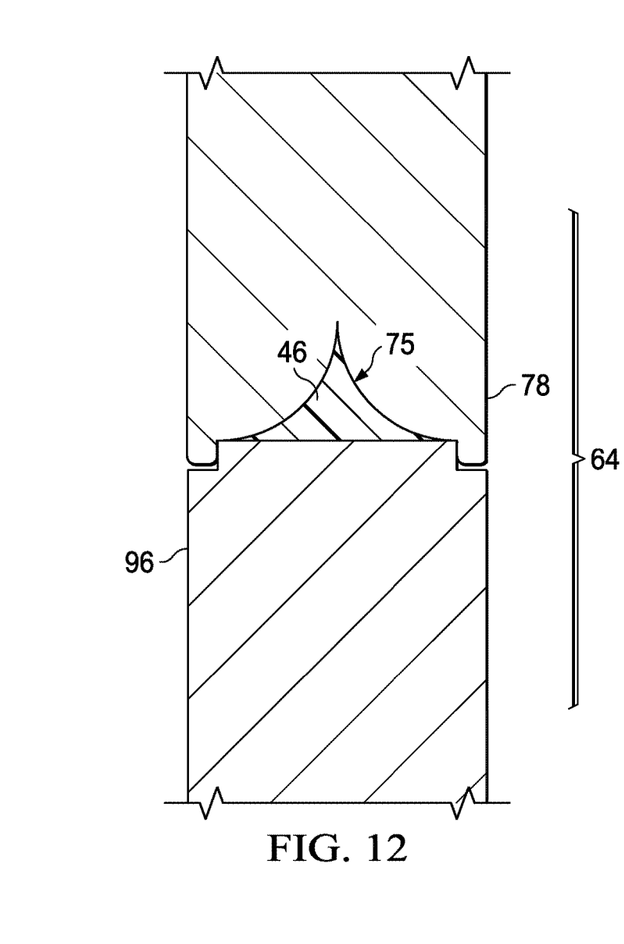
FIG. 12 is an illustration similar to Figure but showing the upper and lower roller dies in a closed position, while a noodle is being pulled through the nip.

FIGS. 11 and 12 illustrate features of the die faces 86, 98 in more detail. In combination, the die faces 86, 98 form a nip 75 therebetween having a cross-sectional profile or die opening that substantially matches that of the noodle 46 to be formed. The grooved die face 86 comprises a pair of a radiused sections 86a. while the flat die face 98 is provided with notches 110 along opposite edges thereof. The notches 110 form shoulders 113 on the lower roller die 96 which are adapted to engage and roll along with the ends 115 of the upper roller die 78.

The upper roller die 78 further includes a slot-like recess 86c having a width substantially equal to the width $W_1$ of the flat die face 98. When the upper roller die 78 is brought into engagement with the lower roller die 96, the die face 98 is received within the recess 86c. Beveled edges 86b assist in guiding the die face 98 into the recess 86c, and bringing the upper roller die 78 into aligned registration, interlocked with the lower roller die 96. Once the flat die face 98 is received within the recess 86c, the upper roller die 78 and the lower roller die 96 remain in registered relationship relative to each other as composite material 54 is being drawn through the nip 75 along axis 83 and the noodle 46 is being formed. The interlocking relationship between the die face 98 and the recess 86c assists in maintaining the axes of rotation 90, 102 substantially parallel to each other. As the composite material is being drawn through the nip 75, the upper roller die 78 and the lower roller die 96 rotate, substantially limiting friction between the composite material and the dies at 78, 96 to rolling friction.

Figure 13:
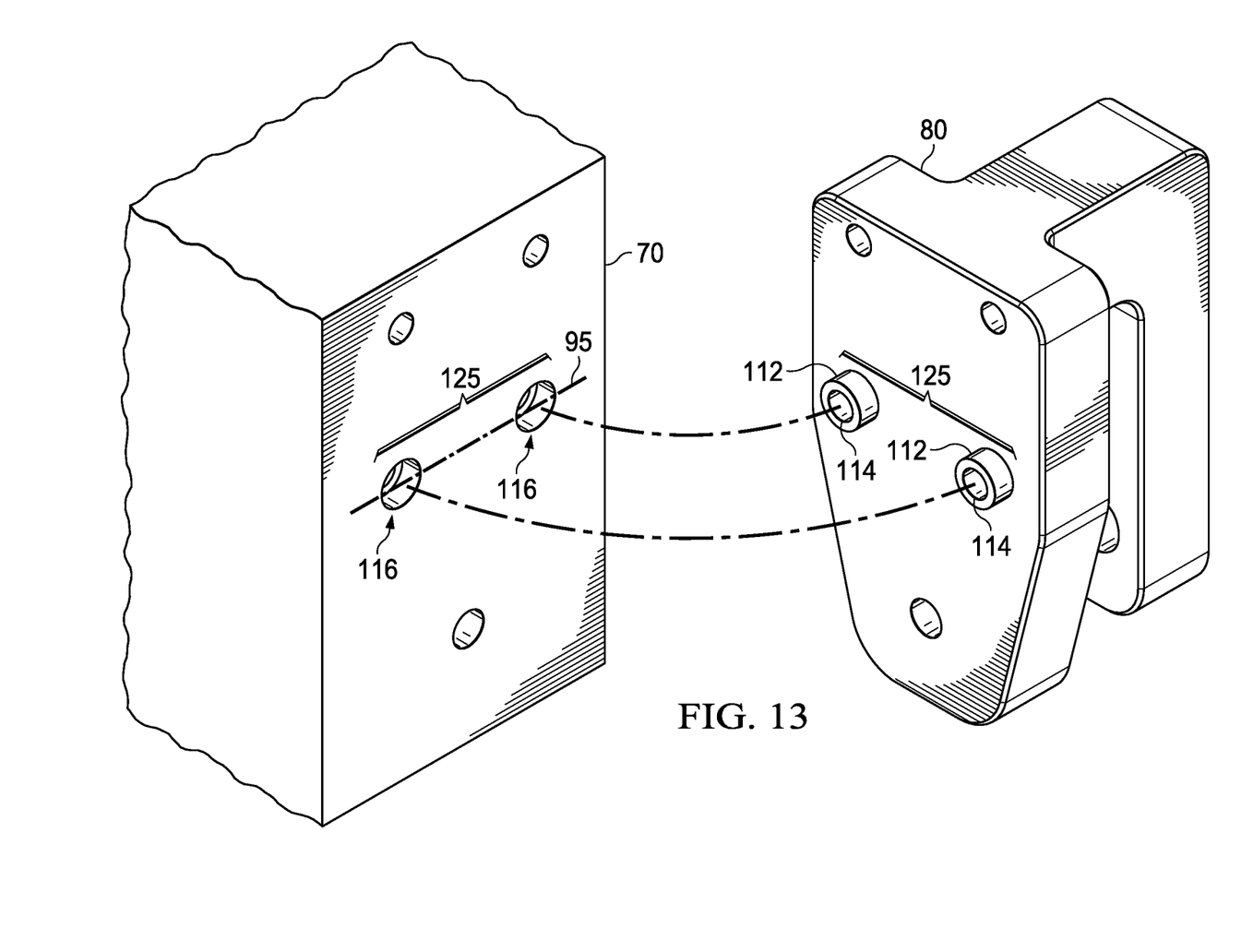
FIG. 13 is an illustration of the upper roller die mount attached to an upper mount, showing a part of an indexing arrangement.
Figure 14:
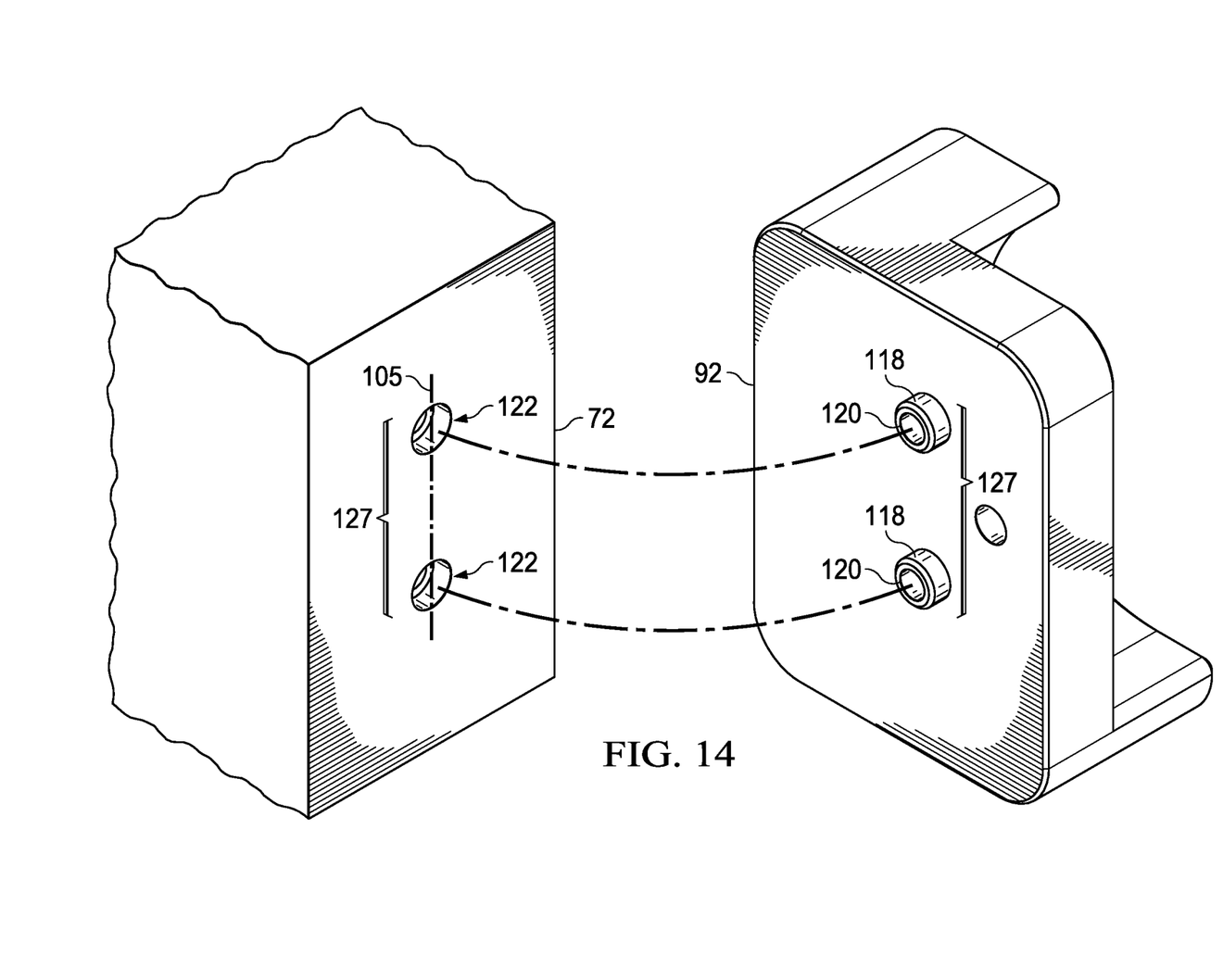
FIG. 14 is an illustration of the lower roller die mount and a lower mount, showing another part of the indexing arrangement.

Referring to FIGS. 13 and 14, the disclosed embodiments include an indexing arrangement for mounting the upper and lower roller die assemblies 64a, 64b in a manner that maintains a desired alignment of the upper and the lower roller dies 78, 96 respectively. By maintaining the desired alignment of the upper and lower roller dies 78, 96, the profile of the nip 75, and thus the cross-sectional profile of the noodle 46, is maintained within desired tolerances. The indexing arrangement comprises a first set of indexing points 125 between the upper roller die mount 80 and the upper mount 70, and a second set of indexing points 127 between the lower mount back 92 and the lower mount 72. The indexing points 125 in the first set thereof are spaced apart from each other along a first axis 95, and may comprise, for example and without limitation, projections such as raised bosses 112 surrounding fastener openings 114, and countersunk recesses 116 in the upper mount 70. Similarly, the indexing points 127 in the second set thereof are spaced apart from each other along a second axis 105 that is orthogonal to the first axis 95. The second set of indexing points 127 may comprise projections such as raised bosses 118 surrounding fastener holes 120, which are received within countersunk recesses 122 in the lower mount 72.

Figure 15:
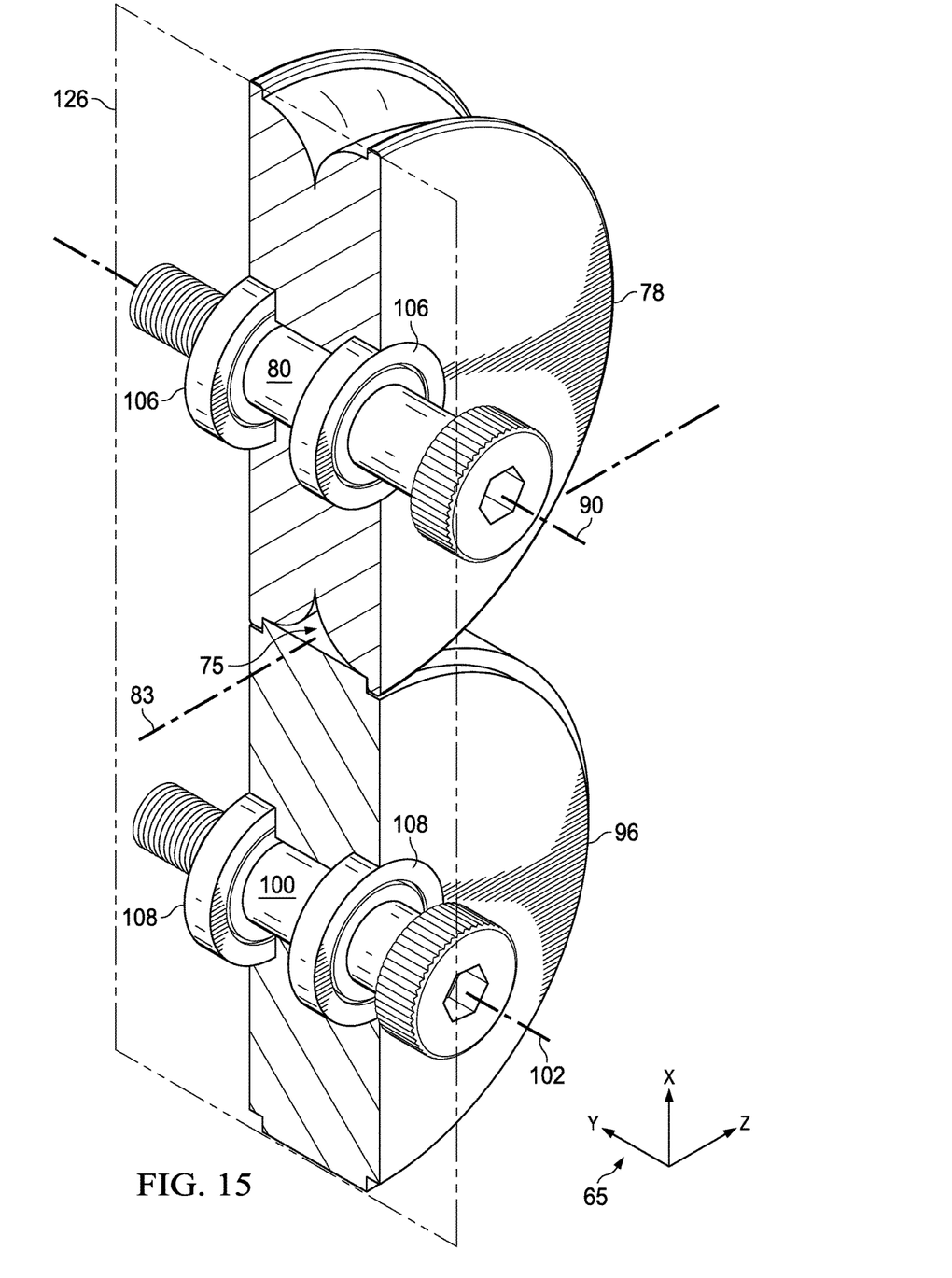
FIG. 15 is an illustration of a sectional perspective view showing angular co-alignment of the upper and lower roller dies achieved by the indexing arrangements shown in FIGS. 13 and 14.

Referring now to FIG. 15, the use of the first and second sets of indexing points 125, 127 described above in connection with FIGS. 13 and 14 results in spatially orienting the roller dies 78, 96 within the machine coordinate system 65 such that the rotational axes 90, 102 extend parallel to each and lie within a plane 126 that is substantially orthogonal to the axis 83 of movement along which the composite material 54 is drawn through the nip 75. As previously mentioned, the substantially parallel alignment of the rotational axes 90, 102 in this manner results in a precise spatial orientation of the die faces 86, 98 to form a nip 75 having the desired die opening profile.

Figure 16:
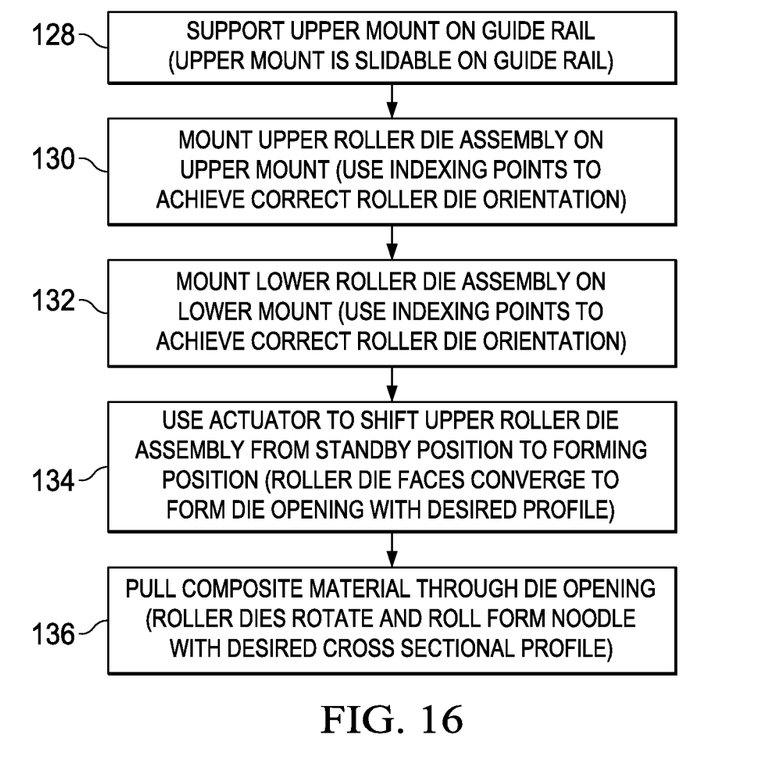
FIG. 16 is an illustration of a flow diagram of a method of forming a filler noodle.

FIG. 16 broadly indicates the steps of a method of producing a composite noodle 46 having a desired profile. Beginning at step 128, an upper mount 70 is supported on and slidable along a guide rail 74. At step 130, an upper roller die assembly 64a is mounted on the upper mount 70 using a first set of indexing points 125 to achieve a desired orientation of the upper roller die 78. At 132, a lower roller die assembly 64b is mounted on a lower mount 72 using a second set of indexing points 127 to achieve a desired orientation of the lower roller die 96. At 134, an actuator 66 is used to shift the upper roller die assembly 64a from a standby position, to an operative, forming position. The actuator causes the upper and lower roller dies 78, 96 to converge and form a nip 75 having a desired profile. At 136, composite material 54 is pulled through the nip 75. As the composite material before is pulled through the nip 75, the upper and lower roller dies 78, 96 rotate and essentially roll-form the noodle 46 with the desired cross-sectional profile.

Figure 17:
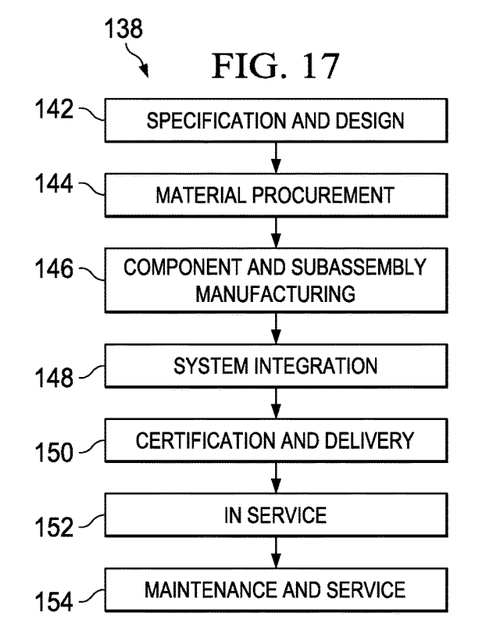
FIG. 17 is an illustration of a flow diagram of aircraft production and service methodology.
Figure 18:
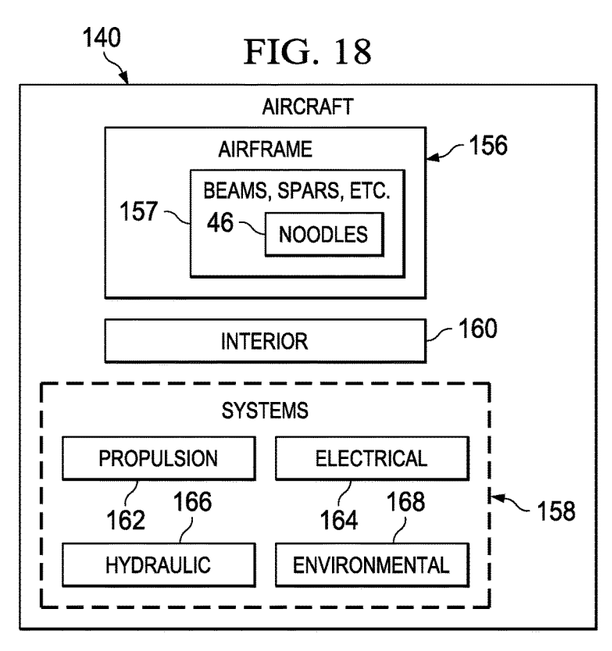
FIG. 18 is an illustration of a block diagram of an aircraft.

Embodiments of the disclosure may find use in a variety of potential applications, particularly in the transportation industry, including for example, aerospace, marine, automotive applications and other application where joints between composite members require strengthening. Thus, referring now to FIGS. 17 and 18, embodiments of the disclosure may be used in the context of an aircraft manufacturing and service method 138 as shown in FIG. 17 and an aircraft 140 as shown in FIG. 18. Aircraft applications of the disclosed embodiments may include, for example, without limitation, filler noodles used to fill voids and/or strengthen joints in composite beams, spars and other stiffeners. During pre-production, exemplary method 138 may include specification and design 142 of the aircraft 140 and material procurement 144. During production, component and subassembly manufacturing 146 and system integration 148 of the aircraft 140 takes place. Thereafter, the aircraft 140 may go through certification and delivery 150 in order to be placed in service 152. While in service by a customer, the aircraft 140 is scheduled for routine maintenance and service 154, which may also include modification, reconfiguration, refurbishment, and so on.

Each of the processes of method 138 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 18, the aircraft 140 produced by exemplary method 138 may include an airframe 156 with a plurality of systems 158 and an interior 160. Examples of high-level systems 158 include one or more of a propulsion system 162, an electrical system 164, a hydraulic system 166 and an environmental system 168. Any number of other systems may be included. The disclosed method and apparatus may be employed to produce filler noodles used to strengthen composite assemblies used in the airframe 156. Although an aerospace example is shown, the principles of the disclosure may be applied to other industries, such as the marine and automotive industries.

Systems and methods embodied herein may be employed during any one or more of the stages of the production and service method 138. For example, components or subassemblies corresponding to production process 146 may be fabricated or manufactured in a manner similar to components or subassemblies produced while the aircraft 140 is in service. Also, one or more apparatus embodiments, method embodiments, or a combination thereof may be utilized during the production stages 146 and 148, for example, by substantially expediting assembly of or reducing the cost of an aircraft 140. Similarly, one or more of apparatus embodiments, method embodiments, or a combination thereof may be utilized while the aircraft 140 is in service, for example and without limitation, to maintenance and service 154.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. Apparatus for producing a composite filler noodle, comprising:
   a first roller die assembly including a first roller die rotatable about a first axis of rotation; and
   a second roller die assembly including a second roller die rotatable about a second axis of rotation, wherein:
   the first roller die includes a pair of radiused sections facing the second roller die assembly, the pair of radiused sections arcing toward each other and away from the second roller die such that a nip forms between the first roller die and the second roller die, the nip extending into the first roller die and away from the second roller die, and wherein a composite material may be drawn through the nip along an axis of movement;

the first roller die further includes a pair of ends extending past the pair of radiused sections, the pair of ends extending in a radial direction relative to the first roller die, the pair of ends further disposed on opposite sides relative to the radiused sections;

the second roller die includes a pair of notches disposed into the second roller die in a radial direction relative to the second roller die, the pair of notches further disposed opposite the pair of ends such that when the first roller die is brought into contact with the second roller die the pair of ends fit into the pair of notches to form a registration between the first roller die and the second roller die; and wherein the first axis of rotation and the second axis of rotation extend substantially parallel to each other within a plane substantially orthogonal to the axis of movement.

2. The apparatus of claim 1, further comprising:
an upper mount having the first roller die assembly mounted thereon; and
a lower mount having the second roller die assembly thereon,
wherein the upper and lower mounts are arranged in a predetermined spatial orientation relative to each other.

3. The apparatus of claim 2, wherein:
the registration aligns the first and second roller die assemblies relative to each other.

4. The apparatus of claim 1, wherein the first axis of rotation is movable toward and away from the second axis of rotation while remaining substantially parallel to the second axis of rotation.

5. The apparatus of claim 1, further comprising:
a guide rail, and
wherein the first roller die assembly is mounted for sliding movement on the guide rail, toward and away from the second roller die assembly.

6. The apparatus of claim 5, further comprising:
an actuator for sliding the first roller die assembly along the guide rail.

7. The apparatus of claim 1, wherein:
the first roller die includes a first die face for forming a first portion of the filler noodle, and
the second roller die includes a second die face for forming a second portion of the filler noodle.

8. A pultrusion die apparatus for forming a composite noodle, comprising:
a first roller die; and
a second roller die, wherein:
the first roller die includes a pair of radiused sections facing the second roller die assembly, the pair of radiused sections arcing toward each other and away from the second roller die such that a nip forms between the first roller die and the second roller die, the nip extending into the first roller die and away from the second roller die;
the first roller die further includes a pair of ends extending past the pair of radiused sections, the pair of ends extending in a radial direction relative to the first roller die, the pair of ends further disposed on opposite sides relative to the radiused sections;

the second roller die includes a pair of notches disposed into the second roller die in a radial direction relative to the second roller die, the pair of notches further disposed opposite the pair of ends such that when the first roller die is brought into contact with the second roller die the pair of ends fit into the pair of notches to form a registration between the first roller die and the second roller die.

9. The pultrusion die apparatus of claim 8, wherein the first roller die is shiftable relative to the second roller die, between an open, standby position, and a closed, forming position.

10. The pultrusion die apparatus of claim 9, wherein the second roller die is fixed.

11. The pultrusion die apparatus of claim 9, further comprising:
a guide rail; and
a mount slidable on the guide rail and having the first roller die mounted thereon.

12. The pultrusion die apparatus of claim 8, further comprising:
a first mount upon which the first roller die is mounted for rotation about a first axis; and
a second mount upon which the second roller die is mounted for rotation about a second axis.

13. The pultrusion die apparatus of claim 8, wherein the first roller die includes a beveled surface.

14. The pultrusion die apparatus of claim 8 further comprising:
a first actuator configured to shift the first roller die into forming position; and
a second actuator configured to shift the second roller die into forming position.

15. The apparatus of claim 1 wherein the second roller die further comprises a flat die face that faces the pair of radiused sections.

16. The apparatus of claim 1 further comprising:
a first actuator configured to shift the first roller die into forming position; and
a second actuator configured to shift the second roller die into forming position.

17. The apparatus of claim 16 further comprising:
a puller configured to continuously pull the composite material through the nip as the first roller die and the second roller die rotate.

18. The apparatus of claim 17 further comprising:
a heater configured to heat the composite material to a desired temperature before the composite material is pulled through the nip.

19. The apparatus of claim 18 further comprising:
a cutter configured to cut the composite material to a desired width before the material is heated by the heater.

20. The apparatus of claim 19 further comprising:
a preformer configured to preform the composite material prior to being heated by the heater.

21. The apparatus of claim 20 further comprising:
a plurality of dies configured to mold the composite material after being preformed by the performer.

22. The apparatus of claim 1 further comprising:
an actuator configured to shift the first roller die into forming position.

* * * * *